C. P. STEINMETZ.
SYSTEM OF ELECTRICAL DISTRIBUTION.
APPLICATION FILED OCT. 25, 1905.
996,372.
Patented June 27, 1911.
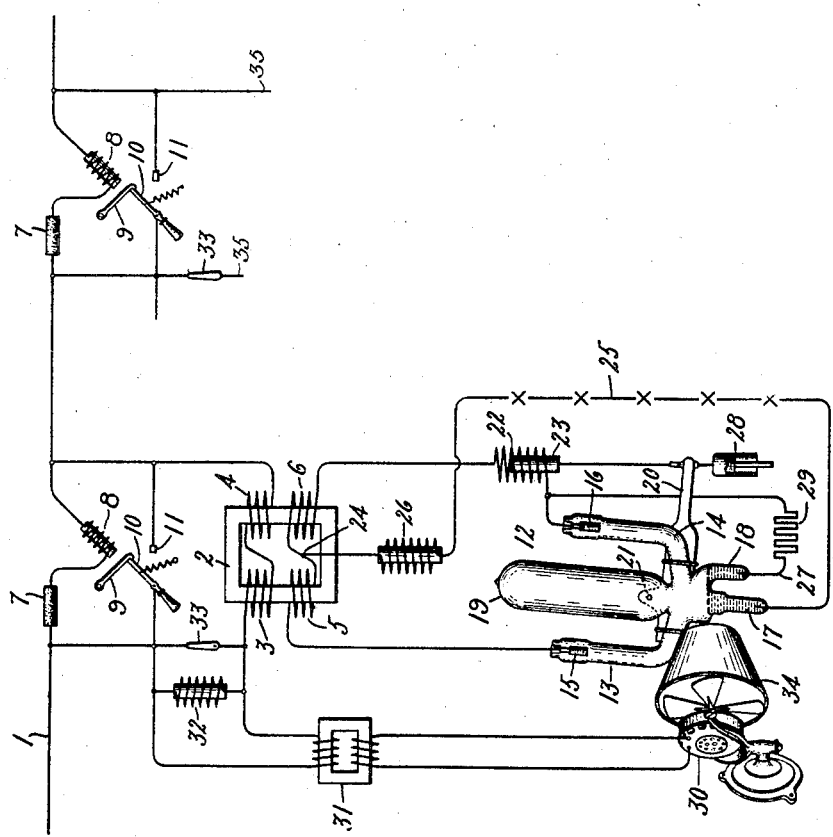
Witnesses:
Helen Orford
Margaret E. Hooley
Inventor:
Charles P. Steinmetz,
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

996,372.      Specification of Letters Patent.    Patented June 27, 1911.

Application filed October 25, 1905. Serial No. 284,308.

*To all whom it may concern:*

Be it known that I, CHARLES P. STEINMETZ, a citizen of the United States, residing at Schenectady, county of Schenectady, State of New York, have invented certain new and useful Improvements in Systems of Electrical Distribution, of which the following is a specification.

The invention hereinafter set forth relates to electric distributing systems and more especially to those employing rectifiers for changing alternating current into direct current.

The novel features which characterize my invention are pointed out with particularity in the appended claims. The invention itself, however, will be better understood by reference to the following specification taken in connection with the accompanying drawings which represent diagrammatically one of the embodiments which my invention may assume in practice.

In the drawing, a series alternating current circuit carrying current of constant value is indicated at 1. This circuit may receive its current from any suitable source such for example as a constant current generator, a constant current transformer, or the like. I provide means whereby current in such a circuit may be rectified and supplied in the form of direct current to a suitable distribution circuit. One arrangement for effecting this object I have indicated in the drawing. Thus, the current from the circuit 1 is fed first to a transformer 2, in this case of the core type. The primary windings 3 and 4 are respectively on different legs of the core and are connected in series with each other and to the circuit 1. Corresponding secondary windings 5 and 6 are located on separate core legs and adjacent to the primary windings 3 and 4 and like the latter are connected in series with each other. By location on different core legs the coils may be effectively insulated for the high potential currents employed. Also by putting the secondary coils 5 and 6 on separate legs of a core type transformer, the unidirectional current through these windings sets up a high magnetization in the respective legs of the core and induces a high leakage through the magnetic air gap separating the coils. As one practical result of this, the coils exert a reactive effect on the successive pulsations of the current carried by them and this reactive effect is effective to shift the phase of the current pulsations in such a way that the pulsations overlap.

The transformer primary is normally traversed by the full current passing in the circuit 1. Therefore the voltage consumed by the primary varies with the load on the secondary. In order to provide against a condition of open circuit on the secondary or against conditions approximating the same, which would cause an undue rise in voltage on the primary, I provide a suitable time limit cut-out device. This takes the form in the present instance of a stick 7 of magnetite or similar material of high resistance when cold but which when heated becomes a very good conductor. This magnetite stick is in series with a magnet 8 across the terminals of the transformer primary. In case the voltage across the primary rises abnormally, the magnetite stick thereby has current forced through it and, upon becoming heated, rapidly reduces in resistance and thereby causes a large proportion of current to be diverted from the transformer through this cut-out circuit. The magnet 8 then becomes energized and draws up its armature 9 which serves as a latch for the short-circuiting switch 10. This latter switch then engages its coöperating contact 11 and short-circuits the transformer 2 permanently and so cuts it out of circuit. When, however, the apparatus represented in the drawings is in normal operation, the secondaries 5 and 6 feed current to a rectifier system of a general type now well understood in the art. The rectifier shown consists briefly of a highly exhausted receptacle having a plurality of electrodes therein one of which usually is of mercury and serves as the cathode while the others operate as anodes. This exhausted receptacle is indicated at 12. It consists of a vessel, generally of glass, having arms 13 and 14 containing anodes 15 and 16, while at the bottom of the receptacle there are adjacently-located pockets containing bodies of mercury 17 and 18, the first of which is the cathode and the latter an auxiliary starting anode. The upper portion of the receptacle is expanded into a bulb 19 serving as a condenser chamber for the surplus mercury vaporized during the operation of the apparatus. The rectifier 12 is mechanically carried by a support such as 20 pivoted in some suitable way as at 21. A solenoid 22 having a core 23 pivotally connected to the member 20 serves when energized to tilt the apparatus from the position shown. This position is that which the apparatus assumes when it is out of operation. The position is one of inclination such as to cause the mercury 17 to flow over and make contact with the mercury 18. The purpose of this will now be explained.

In connecting up the apparatus, the two anodes 15 and 16 are connected to the outside terminals of the secondaries 5 and 6. The junction 24 between these secondaries is connected to the series load circuit 25, the other end of which is joined to the cathode 17. The inductance coil 26 in series with this circuit keeps the rectifier arcs alive in a well understood manner and also serves to smooth out the current. The solenoid 22 which has already been referred to, is connected in series with one of the anode leads as, for example, that lead extending to the anode 16, and is in circuit with the lead 27 extending to the auxiliary anode 18. When now current is supplied to the apparatus, the solenoid 22 is energized and slowly tilts the rectifier against the resistance offered by the dash-pot 28. In tilting, the bodies of mercury 17 and 18 separate and thereupon an arc forms, due to a current flowing from the secondary 6 through the coil 22 to the anode 18, cathode 17 and back through the consumption circuit 25 to the junction 24 between the secondaries 5 and 6. This auxiliary arc starts into operation the main arcs from the anodes 15 and 16 to the cathode 17 in a manner now well understood. A resistance 29 in series with the anode 18, which resistance may either be inductive or non-inductive, immediately causes the auxiliary arc to go out as soon as the main arc from the anode 16 starts up.

In order to assist in the cooling of the rectifier during operation and to reduce to a considerable extent any tendency which the rectifier may have to arc between the anodes 15 and 16, I cause a draft of air to be directed against the rectifier in the vicinity of the cathode 17. This object may be accomplished by means, for example, of a fan motor 30 fed with current from any suitable source, such as the small transformer 31 the primary of which may be connected in shunt to a current-adjusting resistance or inductance 32 in series with the supply mains. A short-circuiting switch 33 serves to cut out the fan motor circuit when desired. For directing the blast from the fan motor, a suitable conduit may be provided as, for example, a cone 34 pointed so as to deliver a blast of air against the region of the cathode 17. This blast of air serves to condense vaporized mercury as soon as it is given off from the cathode without at the same time cooling the region about the anodes 15 and 16. It is desirable that the anode regions should run hot so as to prevent mercury from being condensed and from falling in globules against the hot anode surfaces, the occurrence of which action is apt to set up arcing.

Though I have shown but one rectifier system in series with the supply circuit 1 it is obvious that other rectifier systems may be included in circuit therewith as, for example, I have indicated by the mains 35 which may be used to supply another rectifier or other consumption circuit.

What I claim as new and desire to secure by Letters Patent of the United States, is:

1. The combination of an exhausted envelop having a plurality of main anodes and a coöperating cathode, an auxiliary starting anode, said starting anode and cathode both being of fluid material, a pivoted support for the apparatus normally balanced so that the two fluid electrodes are in contact with each other, a solenoid in series with the auxiliary anode for tilting the apparatus to produce a starting arc, means for retarding the tilting motion and a voltage consuming device in series with the starting arc for interrupting the same when the apparatus starts.

2. The combination of a core type transformer having a primary winding connected in circuit, a secondary winding consisting of coils located respectively on different legs of the core of said transformer, and a vapor electric apparatus provided with anodes connected to the terminals of the secondary circuit and with a cathode connected by a return circuit to an intermediate point of the secondary winding.

3. The combination of a core type transformer having a primary winding connected in circuit, a secondary winding consisting of coils located respectively on different legs of the core of said transformer, a vapor electric apparatus provided with anodes connected to the terminals of the secondary circuit and with a cathode connected by a return circuit to an intermediate point of the secondary winding, and a time-limit short-circuiting device responsive to a rise of voltage for the primary of said transformer.

4. The combination of an exhausted envelop having a plurality of anodes and a coöperating cathode, said cathode being of fluid material, an auxiliary starting anode a pivoted support for the apparatus normally balanced, so that the cathode makes contact with the starting anode, and a solenoid for tilting the apparatus to produce a starting arc, said solenoid being in circuit with the starting anode and also in circuit with a main anode.

5. In combination, a source of energy, a vapor electric device having a plurality of main anodes, and a mercury cathode and a starting anode, the latter being in contact when the device is not operating, a solenoid in circuit with a main anode and the starting anode, for separating the cathode and auxiliary anode and also maintaining the same separated after the starting arc has been broken.

In witness whereof, I have hereunto set my hand this 23rd day of October, 1905.

CHARLES P. STEINMETZ.

Witnesses:
 BENJAMIN B. HULL,
 HELEN ORFORD.